(12) United States Patent
Aimi et al.

(10) Patent No.: US 8,604,387 B2
(45) Date of Patent: Dec. 10, 2013

(54) CONTROL METHOD FOR ARC WELDING APPARATUS AND ARC WELDING APPARATUS

(75) Inventors: Kei Aimi, Osaka (JP); Hidetoshi Oyama, Osaka (JP); Atsuhiro Kawamoto, Hyogo (JP); Masaru Kowa, Osaka (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 12/787,490

(22) Filed: May 26, 2010

(65) Prior Publication Data

US 2010/0224608 A1 Sep. 9, 2010

Related U.S. Application Data

(62) Division of application No. 10/584,852, filed as application No. PCT/JP2005/022644 on Dec. 9, 2005, now Pat. No. 7,928,340.

(30) Foreign Application Priority Data

Feb. 28, 2005 (JP) ................................. 2005-052829

(51) Int. Cl.
*B23K 9/12* (2006.01)
(52) U.S. Cl.
USPC ........... 219/137 PS; 219/130.32; 219/130.33; 219/136
(58) Field of Classification Search
USPC ............. 219/121.11, 130.21, 130.31–130.33, 219/137 PS, 137 R, 136
See application file for complete search history.

(56) References Cited

U.S. PATENT DOCUMENTS

| | | | |
|---|---|---|---|
| 5,942,139 A | | 8/1999 | Moriguchi et al. |
| 6,025,573 A | * | 2/2000 | Stava ...................... 219/130.21 |

FOREIGN PATENT DOCUMENTS

| | | |
|---|---|---|
| EP | 1 206 992 | 5/2002 |
| JP | 3-281063 | 12/1991 |
| JP | 4-284972 | 10/1992 |
| JP | 10-180443 | 7/1998 |
| WO | 03/037560 | 5/2003 |

OTHER PUBLICATIONS

Supplemental European Search Report dated Apr. 7, 2009 in corresponding European Application No. EP 05 81 4756.
European Search Report issued Jun. 9, 2009 in European application EP 09159668 that is a counterpart to the present application.
International Search Report issued Mar. 14, 2006 in PCT/JP2005/022644, of which the parent application is the National Stage Entry.

* cited by examiner

*Primary Examiner* — Brian Jennison
(74) *Attorney, Agent, or Firm* — Wenderoth, Lind & Ponack, L.L.P.

(57) ABSTRACT

A control method for an arc welding apparatus having a function of prohibiting detection of neck based on a change amount of welding voltage and an arc welding apparatus using the method. Thus, since neck determination can be carried out accurately by preventing wrong detection of neck, it is possible to reduce the occurrence of spatter.

8 Claims, 6 Drawing Sheets

CONTROL METHOD FOR ARC WELDING APPARATUS AND ARC WELDING APPARATUS

This application is a Divisional of U.S. application Ser. No. 10/584,852, now U.S. Pat. No. 7,928,340, which is a national stage application of International application No. PCT/JP2005/022644, filed Dec. 9, 2005.

TECHNICAL FIELD

The present invention relates to a control method for an arc welding apparatus and an arc welding apparatus.

BACKGROUND ART

Arc welding carries out welding by generating arc between a welding wire and a welding base material. A consumable electrode type arc welding apparatus (hereinafter, referred to as "a welding apparatus") predicts that a short circuit is opened and reduces welding current just before short circuit is opened in order to suppress the generation of spatter. This is a so-called neck detection control. Then, arc force is suppressed by reducing welding current at the moment at which arc is generated again.

In a conventional welding apparatus, when a short circuit occurs, a control circuit for controlling a welding output increases an electric current in accordance with a predetermined tilt in order to open the short circuit. Then, in accordance with this increase of electric current, a wire in a short-circuit part is melted and the molten metal is shifted to the side of a base material, so that a constricted portion (a so-called neck, which is referred to as "neck," hereinafter) is formed between the welding wire and the molten portion at the side of the base material. Since the cross-sectional area at this neck portion becomes small, the resistance value is increased. Therefore, when neck is formed, although the increase of electric current is kept constant by short-circuit control, a change amount of welding voltage is increased. Then, by detecting the change amount of voltage, the formation of neck is detected, and the process is proceeded to neck detection control.

Herein, a conventional welding apparatus is provided with a switching element for switching rectified AC power supply in order to obtain an output suitable for welding as mentioned below. Then, under the effect of this switching element, ripple voltage synchronous with switching of the switching element is superimposed on the welding voltage. This ripple voltage may lower the neck detection probability. Therefore, Japanese Patent Unexamined Publication No. H10-180443 discloses removal of noise such as ripple voltage.

Figure 8:
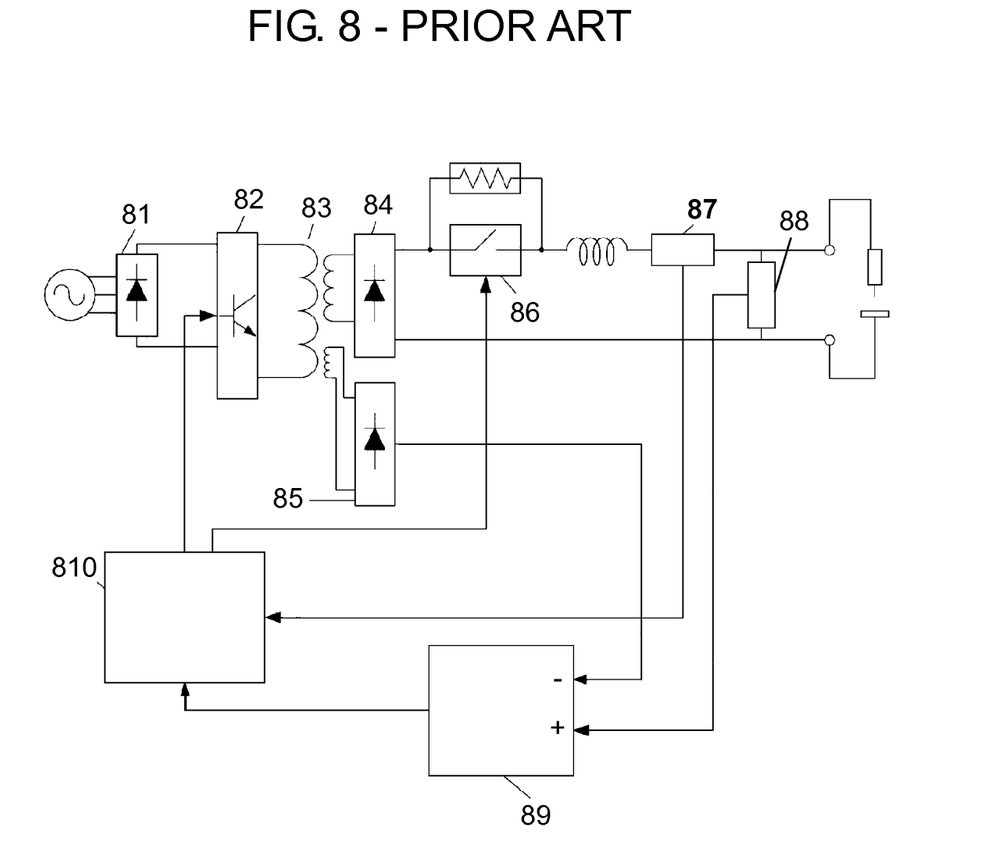
FIG. 8 is a block diagram showing a schematic configuration of a conventional arc welding apparatus.

FIG. 8 shows a schematic configuration of a conventional welding apparatus. The welding apparatus includes first rectifying element 81 for rectifying AC power supply, first switching element 82 for switching the output from first rectifying element 81, main transformer 83 supplying welding load with electric power and being provided with secondary side auxiliary winding, second rectifying element 84 for rectifying the output from main transformer 883, third rectifying element 85 for rectifying the output from the auxiliary winding of main transformer 83, second switching element 86 provided between second rectifying element 84 and an output terminal, current detector 87, voltage detector 88, differential amplifier circuit 89 for operating the difference between the output from voltage detector 88 and the output from third rectifying element 85, and welding control circuit 810 for controlling a welding output by controlling first switching element 82 and second switching element 86.

Next, an operation of the apparatus is described. Electric power supplied from an AC power supply is made into a direct current by first rectifying element 81. The direct current electric power is input into main transformer 83 as necessary electric power in accordance with a welding state by first switching element 82. A large current obtained from the output side of main transformer 83 is made into a direct current by second rectifying element 84, and supplied as an electric power to a welding load through second switching element 86. Welding current flowing to the welding load is detected by current detector 87 and fed back to the control circuit. Furthermore, welding voltage applied to the welding load is detected by voltage detector 88. Herein, the welding voltage detected by voltage detector 88 includes a ripple component generated by first switching element 82. Furthermore, the output from third rectifying element 85 includes a ripple component by first switching element 82. Thus, the difference between the output from third rectifying element 85 and the output from voltage detector 88 is operated by differential amplifier circuit 89, and thereby the ripple component included in the welding voltage can be removed. Thus, welding voltage from which the ripple component has been removed is input into welding control circuit 810 and used for accurate detection of a neck portion or control of welding output.

Figure 9:
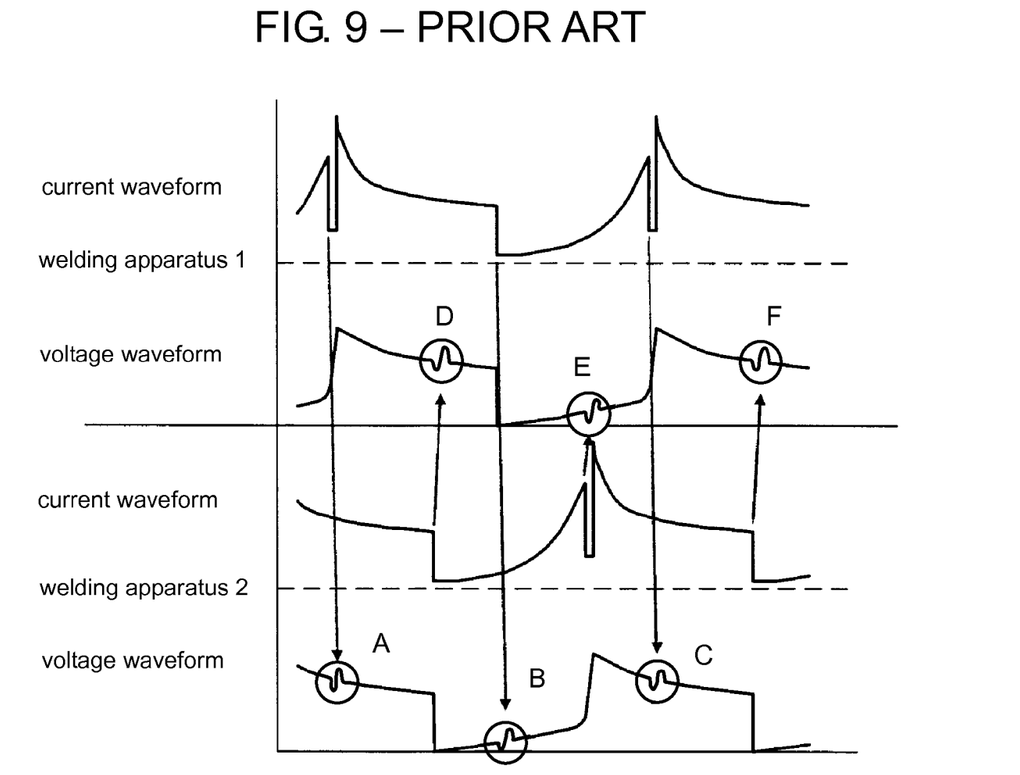
FIG. 9 is a graph showing an example in which a switching operation of one welding apparatus has influence on a voltage waveform of the other welding apparatus.

As mentioned above, a conventional welding apparatus can carry out control and the like of the welding output by removing the effect of a ripple component by a switching element constituting a welding apparatus itself. However, there has been a problem that other noises made by the welding apparatus itself or noises caused by the influence of the other equipment, and the like, could not be removed sufficiently. The noises caused by the influence of the other equipment include, for example, as shown in FIG. 9, noise caused by a switching operation for output control of one welding apparatus 1 and generated in welding voltage of the other welding apparatus 2 when weldings are carried out with respect to the same work by a plurality of welding apparatuses. In FIG. 9, references A, B and C indicate noises of voltage waveform of welding apparatus 2 caused by the switching operation of welding apparatus 1. Likewise, references D, E and F indicate noises of voltage waveform of welding apparatus 1 by the switching operation of welding apparatus 2. Then, in a case where noise cannot be removed, wrong detection of neck occurs. As a result, due to this wrong detection of neck, since detection control is carried out with respect to a neck that is not a neck by nature, it has been difficult to suppress the occurrence of spatter or to obtain an excellent welding result. Furthermore, depending upon the conditions such as noise, opening of short circuit may be detected wrongly.

SUMMARY OF THE INVENTION

The present invention provides a control method for an arc welding apparatus. The method includes detecting welding voltage; calculating a change amount of the welding voltage; and detecting neck of a droplet by the change amount of the welding voltage and a second threshold. In the method, based on a result of comparison between the change amount of the welding voltage and a first threshold, detecting the neck of the droplet by the change amount of the welding voltage and the second threshold is prohibited for a predetermined period.

Furthermore, the present invention provides an arc welding apparatus including a welding voltage detection part for detecting welding voltage, a voltage change amount detection part for calculating a change amount of the welding voltage detected by the welding voltage detection part, and a comparison part for comparing a first threshold and/or a second threshold with a calculation result of the voltage change amount detection part. In the apparatus, based on the result of comparison between the first threshold and the calculation result of the voltage change amount detection part, detection of neck of a droplet by the second threshold and the calculation result of the voltage change amount detection part is prohibited for a predetermined period. The above-mentioned control method for an arc welding apparatus and the arc welding apparatus of the present invention enables an accurate neck determination by prohibiting the detection of neck based on the change amount of the welding voltage thereby preventing the wrong detection of neck.

Furthermore, the present invention provides a control method for an arc welding apparatus. The method includes detecting welding voltage; calculating a change amount of the welding voltage; determining a constricted portion of a droplet based on the change amount of the welding voltage and a neck determination threshold of a droplet, storing a short-circuit processing state at that time in case where constricted portion is determined; and determining neck and then determining whether an arc period or a short-circuit period based on the welding voltage, and carrying out a short-circuit processing from the stored short-circuit processing state in a case where the short-circuit period is determined when a predetermined period has passed after neck was determined.

Furthermore, the present invention provides an arc welding apparatus including a neck determination part for determining neck of a droplet based on a change amount of welding voltage and a constricted portion determination threshold; a control state storage part for storing a short-circuit processing state at the time in a case where neck is determined; an arc/short-circuit determination part for determining whether an arc period or a short-circuit period based on welding voltage after neck is determined; and a welding output control part for carrying out a short-circuit processing from the short-circuit processing state stored in the control state storage portion in a case where a short-circuit period is determined when a predetermined period has passed after neck was determined. Thus, the control method for an arc welding apparatus and the arc welding apparatus according to the present invention can suppress the generation of spatter due to wrong detection of neck by returning to short-circuit control even in a case where a neck state is detected when the welding voltage is changed.

Furthermore, the present invention provides a control method for an arc welding apparatus. The method includes determining that short circuit is opened based on welding voltage and a short-circuit opening determination threshold, storing a short-circuit processing state at the time in a case where it is determined that the short circuit is opened, determining whether an arc period or a short-circuit period based on the welding voltage after it is determined that the short circuit is opened, and carrying out the short-circuit processing from the stored short-circuit processing state in a case where a short-circuit period is determined in a predetermined period after it is determined that the short circuit is opened.

Furthermore, the present invention provides an arc welding apparatus including an arc/short-circuit determination part for determining that short circuit is opened based on welding voltage and a short-circuit opening determination threshold, a control state storage part for storing a short-circuit processing state at the time in a case where it is determined that short circuit is opened, an arc/short-circuit determination part for determining whether an arc period or a short-circuit period based on welding voltage after it is determined that short circuit is opened, and a welding output control part for carrying out a short-circuit processing from a short-circuit processing state stored in the control state storage part in a case where a short-circuit period is determined in a predetermined period after the opening of the short-circuit period is determined. Thus, the control method for an arc welding apparatus and the arc welding apparatus using the same of the present invention can suppress the generation of spatter due to the wrong detection of opening of short circuit by returning to the short-circuit control even if the wrong detection of short circuit is carried out when welding voltage is changed.

REFERENCE MARKS IN THE DRAWINGS

1 AC power supply
2 first rectifying element
3 first switching element
4 main transformer
5 second rectifying element
6 second switching element
7 resistor
8 reactor
9 current detector
10 voltage detector
11 voltage change amount detection portion
12 neck determination part
13 neck detection prohibiting part
14 A/S determination part (arc/short-circuit determination part)
15 welding output control part 16 control state storage part
17 timer part
19 neck detection apparatus
20 welding control apparatus

DETAILED DESCRIPTION OF THE PREFERRED EMBODIMENTS

Hereinafter, examples of the exemplary embodiments of the present invention are described with reference to FIGS. 1 to 7. Note here that each drawing is a schematic view. Furthermore, the abscissas of FIGS. 2 to 7 and FIG. 9 indicate time. It is not intended that the present invention is limited by these exemplary embodiments.

First Exemplary Embodiment

Figure 1:
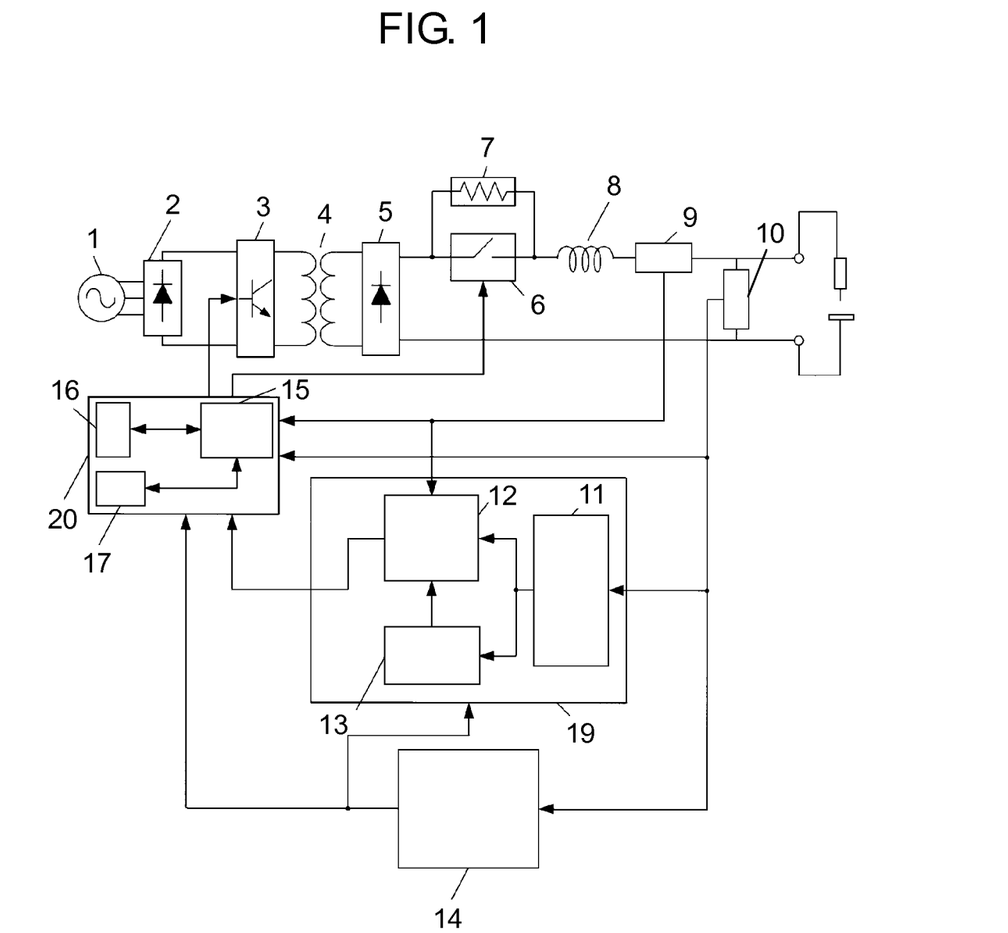
FIG. 1 is a block diagram showing a schematic configuration of an arc welding apparatus in accordance with first to third exemplary embodiments of the present invention.

FIG. 1 is a block diagram showing a schematic configuration of an arc welding apparatus (hereinafter, referred to as "a welding apparatus") in this exemplary embodiment. In FIG. 1, the welding apparatus includes AC power supply 1 for supplying electric power, first rectifying element 2 for rectifying the output from AC power supply 1, first switching element 3 for switching the output from first rectifying element 2 in order to obtain an output suitable for welding; main transformer 4 for supplying welding load with electric power; second rectifying element 5 for rectifying the output from main transformer 4, second switching element 6 with one end coupled to second rectifying element 5, resistor 7 coupled in parallel to second switching element 6, reactor 8 coupled in series to second switching element 6 and stabilizing the output of welding current, current detector 9 for detecting the output amount of welding current, and voltage detector 10 for detecting welding voltage. Furthermore, neck detection apparatus 19 for detecting the formation of a constricted portion (hereinafter, referred to as "neck") formed in a welding wire portion at the time of welding includes voltage change amount detection part 11 for calculating the change amount of voltage based on the output from voltage detector 10, neck determination part 12 for determining the detection of neck formed when a short-circuit state is shifted to an arc state during welding based on the output from voltage change amount detection part 11, and neck detection prohibiting part 13 for prohibiting determination processing of neck determination part 12. Note here that a droplet means a drop of metal that has been melted from the tip of a welding wire to be shifted to a base material.

Furthermore, arc/short-circuit determination part (hereinafter, "A/S determination part") 14 detects whether an arc state or a short-circuit state in a welding state based on the output from voltage detector 10. Welding control apparatus 20 includes welding output control part 15, control state storage part 16 and timer part 17. Welding output control part 15 controls the welding output by controlling first switching element 3 and second switching element 6 based on the outputs from current detector 9, voltage detector 10, neck detection apparatus 19 and A/S determination part 14. Control state storage part 16 stores the welding control state of welding output control part 15 temporarily. Timer part 17 measures the time based on a command from welding output control part 15. An operation of the arc welding apparatus configured as mentioned above is described.

Electric power supplied from AC power supply 1 is made into direct current by first rectifying element 2 and supplied to first switching element 3 as direct current power supply. First switching element 3 is on/off controlled by welding output control part 15, which controls the electric power to be supplied to main transformer 4. Then, electric power supplied to main transformer 4 is made into direct current by second rectifying element 5 and supplied to a welding load.

In usual welding time, second switching element 6 is in an ON state and welding current is supplied to a welding load through reactor 8. Note here that in a case where the welding current flowing into the welding load needs to be reduced rapidly (for example, a case where an arc state is shifted to a short-circuit state, or a case where neck is detected, and the like), welding output control part 15 turns off second switching element 6 to block a path through which welding current with low impedance is supplied. Then, energy stored in main transformer 4 is consumed through resistor 7 coupled in parallel to second switching element 6.

Furthermore, current detector 9 detects welding current supplied to the welding load and outputs it as welding current Ia. Voltage detector 10 detects welding voltage applied to the welding load and outputs it as welding voltage Va.

Next, a basic operation of A/S determination part 14 is described with reference to FIG. 2.

Figure 2:
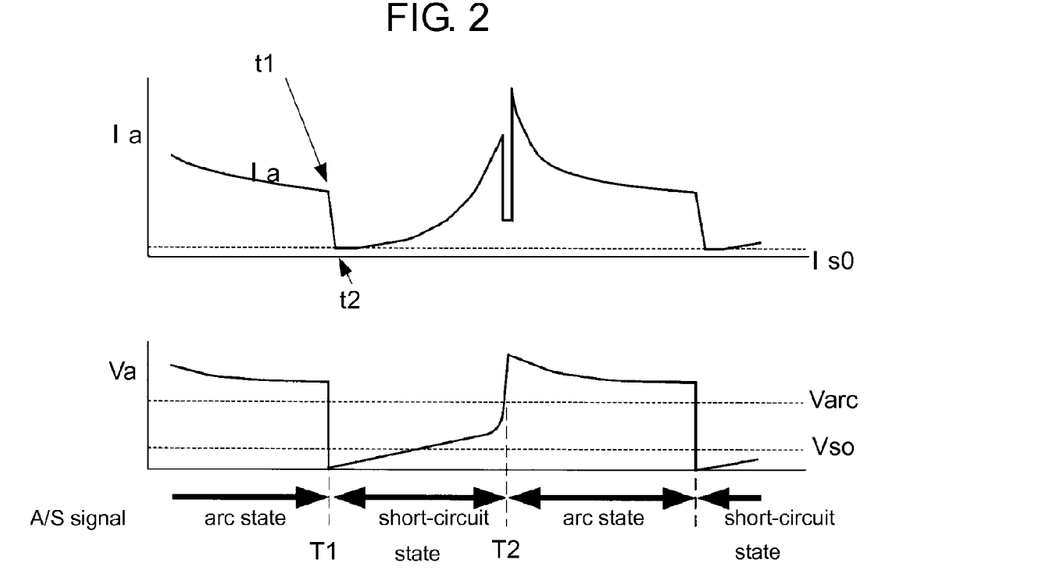
FIG. 2 is a graph showing waveforms of welding current and welding voltage at the time of short circuit welding in accordance with the first exemplary embodiment of the present invention.

FIG. 2 shows waveforms of welding current (Ia) and welding voltage (Va) at the time of short circuit welding. A/S determination part 14 compares welding voltage Va detected by voltage detector 10 with short-circuit determination level Vs0 set for determining the short circuit and stored in a storage part (not shown). Then, when Va becomes not more than Vs0 (reference T1 in FIG. 2), A/S determination part 14 determines that welding becomes a short-circuit state and outputs an A/S signal showing a short-circuit state. When welding output control part 15 receives the A/S signal showing a short-circuit state from A/S determination part 14, it turns off second switching element 6 (t1 in FIG. 2). Thus, control is carried out so that a rapid increase in welding current due the occurrence of a short circuit is prevented and welding current Ia is reduced to a predetermined short-circuit initial current Is0. Thereafter, welding output control part 15 turns on the second switching element (t2 in FIG. 2) so that an electric current can be increased from short-circuit initial current Is0 by a predetermined amount of increase and controls short-circuit electric current for carrying out smooth opening of short circuit by controlling first switching element 3.

Figure 3:
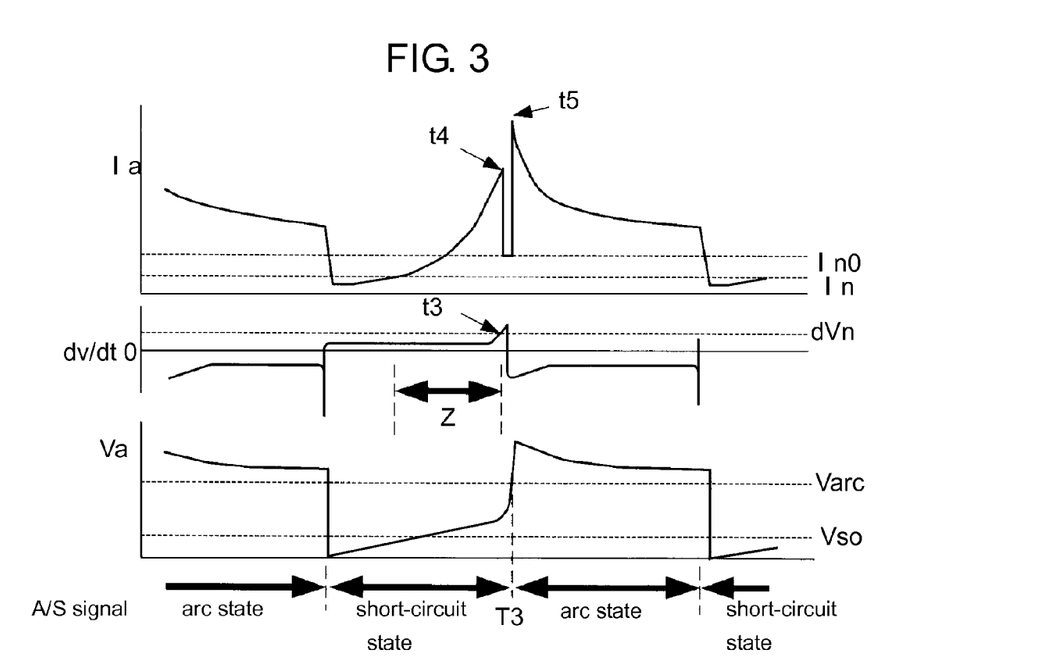
FIG. 3 is a graph showing waveforms of welding current, welding voltage and a change amount of the welding voltage at the time of short circuit welding in accordance with the first exemplary embodiment of the present invention.

Furthermore, A/S determination part 14 determines that the welding state is a short-circuit state and thereafter, compares welding voltage Va with short-circuit opening determination level Varc set for determining that a short circuit is opened and stored in a storage part (not shown). Then, when Va becomes not less than Varc (T2 in FIG. 2), A/S determination part 14 determines that the welding state becomes an arc state and outputs an A/S signal showing an arc state. Next, neck detection operation of neck detection apparatus 19 is described with reference to FIG. 3. FIG. 3 is a graph showing waveforms of welding current (Ia), welding voltage (Va), and welding voltage change amount (dv/dt) at the time of short circuit welding.

Voltage change amount detection part 11 constituting neck detection apparatus 19 detects change amount dv/dt of welding voltage Va per predetermined time. In a case where a signal showing a short-circuit state is input from A/S determination part 14 to neck detection apparatus 19, neck determination part 12 compares voltage change amount dv/dt that is the output from voltage change amount detection part 11 with neck detection level value dVn that has been previously set in a storage part (not shown). Then, in a case where voltage change amount dv/dt is larger than neck detection level value dVn and the below-mentioned neck detection prohibiting part 13 does not prohibit the neck detection, it is determined that the neck is formed and outputs neck detection signal Sn showing the formation of neck (T3 in FIG. 3). Note here that t3 in FIG. 3 indicates the detection of neck. Furthermore, t4 and t5 in FIG. 3 indicate that the second switching element is turned off and that the second switching element is turned on, respectively. Reference Z indicates a neck detection operation range.

Note here that in a short-circuit initial state (for example, in a state in which welding current Ia is low), the value of welding voltage Va may be vibrating. At this time, voltage change amount dv/dt is increased, and a wrong determination of neck may be caused. Therefore, as a condition in which neck determination part 12 carries out neck determination, it is desirable that neck determination is carried out by adding that welding current Ia is not less than the neck current level In that is set previously.

Next, an operation of neck detection prohibiting part 13 mentioned above is described with reference to FIGS. 1 and 4. Note here that the operation of neck detection prohibiting part 13 prevents a wrong detection of neck, which is a point in this exemplary embodiment.

Figure 4:
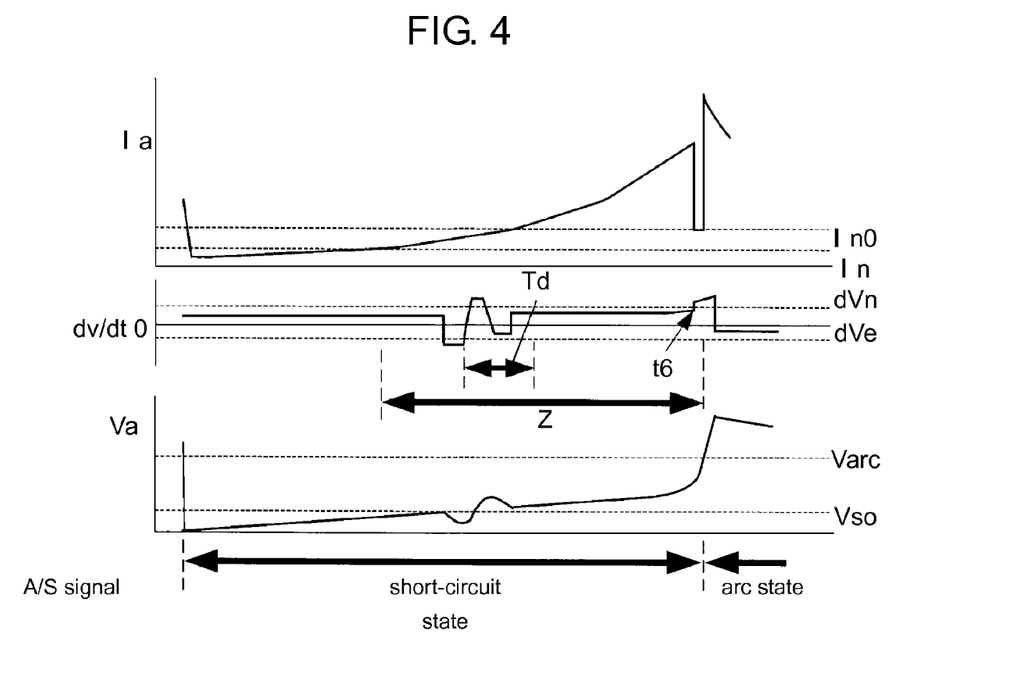
FIG. 4 is a graph showing waveforms of welding current, welding voltage, a change amount of the welding voltage and a state of an A/S signal at the time of short circuit welding in accordance with the first exemplary embodiment of the present invention.

FIG. 4 is a graph showing waveforms of welding current (Ia), welding voltage (Va) and welding voltage change amount (dv/dt) and a state of A/S signal at the time of short circuit welding. FIG. 4 shows an example in which the waveform of welding voltage Va is changed like a wave in part due to noise or disturbance. The factor of this change includes noise generated inside a welding apparatus, or noise or disturbance from the outside equipment. For example, it may include a case where noise is generated in the welding voltage of the welding apparatus in accordance with this exemplary embodiment due to a switching operation and the like for output control in the other welding apparatus, when weldings are carried out with respect to the same welding member by using the welding apparatus shown in this exemplary embodiment and other welding apparatuses.

At the time of short circuit welding, when the short circuit is controlled, since welding current Ia is gradually increased, welding voltage Va shows monotonous increase tendency. However, due to the influence of noise or disturbance, as shown in FIG. 4, wave-like change, which decreases once, subsequently increases and decreases again, may occur in welding voltage Va. In this case, a wrong detection that neck is generated may be carried out although neck is not generated. Next, an operation for preventing such a wrong detection of neck in such a case where voltage change occurs due to noise, etc is explained.

In welding voltage Va that has been changed (decreased once, then increased and decreased again to be back to the original state) due to the influence of noise, etc., since the voltage once decreases, dv/dt that is an output from voltage change amount detection part 11 becomes a negative value. Then, the value is a smaller value (absolute value is larger) than threshold dVe (negative threshold value), which has been previously stored in a storage part (not shown), for preventing the wrong detection of neck. Neck detection prohibiting part 13 inputs this output from voltage change amount detection part 11 and compares it with dVe (negative threshold value). Note here that a comparison part is included in neck detection prohibiting part 13. Then, when dv/dt is smaller than dVe (negative threshold value), for a predetermined time from the point of time (Td), a neck detection prohibition signal is output to neck determination part 12 so as to prohibit the neck determination by neck determination part 12. Herein, a method for prohibiting the neck determination may include a method of not carrying out the comparison between dv/dt and dVn at neck determination part 12 for a predetermined time, and a method of comparing but not outputting neck detection signal Sn even when dv/dt is larger than dVn.

As mentioned above, even when welding voltage Va is changed due to noise or disturbance, it is possible to prevent a wrong detection of neck. That is to say, since the neck can be determined accurately, it is possible to reduce the occurrence of spatter.

Note here that the timing when neck detection prohibiting part 13 outputs a neck detection prohibition signal was a point of time when dv/dt is smaller than dVe (negative threshold value). However, the timing may be a point of time when dv/dt is smaller than dVe and then becomes larger than dVe. Then, for a predetermined time after this point, the neck detection prohibition signal may be output.

Furthermore, the predetermined time for prohibiting the neck detection may be set with switching time, etc. of the switching element etc., which is a factor of noise, taken into consideration, or may be decided based on experiment, etc.

Furthermore, even during the neck detection prohibition period, a comparison between dv/dt and dVe by neck detection prohibiting part 13 is carried out and neck detection may be prohibited for a predetermined time from the point of time when dv/dt is smaller than dVe or at the point of time when dv/dt is larger than dVe. Note here that t6 in FIG. 4 indicates the detection of neck. Reference Z in FIG. 4 indicates a neck detection operating range.

Second Exemplary Embodiment

In this exemplary embodiment, the same reference numerals are given to the same points as in the first exemplary embodiment and detailed description therefor is omitted herein. Furthermore, description for the configuration and operation of the welding apparatus shown in FIG. 1 also may be omitted in part. The configuration and operation not shown in this exemplary embodiment are basically the same as in the first exemplary embodiment. In this exemplary embodiment, control for reducing the influence of the wrong detection of neck when the waveform of welding voltage Va is changed due to noise or disturbance is described with reference to FIGS. 1 and 5. This exemplary embodiment is different from the first exemplary embodiment in that the change of welding voltage by the influence of noise, etc. is convex-shaped voltage change (noise), which increases once and then reduces, not which once reduces, then increases and reduces again as shown in the first exemplary embodiment.

Control for reducing the influence of wrong detection of neck in a case where dv/dt does not become smaller than dVe is described. In more detail, since dv/dt does not become smaller than dVe, it is not possible to carry out neck detection prohibition processing by the comparison between dv/dt and dVe as mentioned above. As a result, voltage change due to noise or the change in the welding environment (for example, disturbance of a shield gas/wire feeding state, or change of the surface state of a welding base material due to an oil film, or the like) may be detected as neck. Control for reducing the influence on the welding property in a case where the voltage change due to noise etc. is detected as neck in this way is described.

Figure 5:
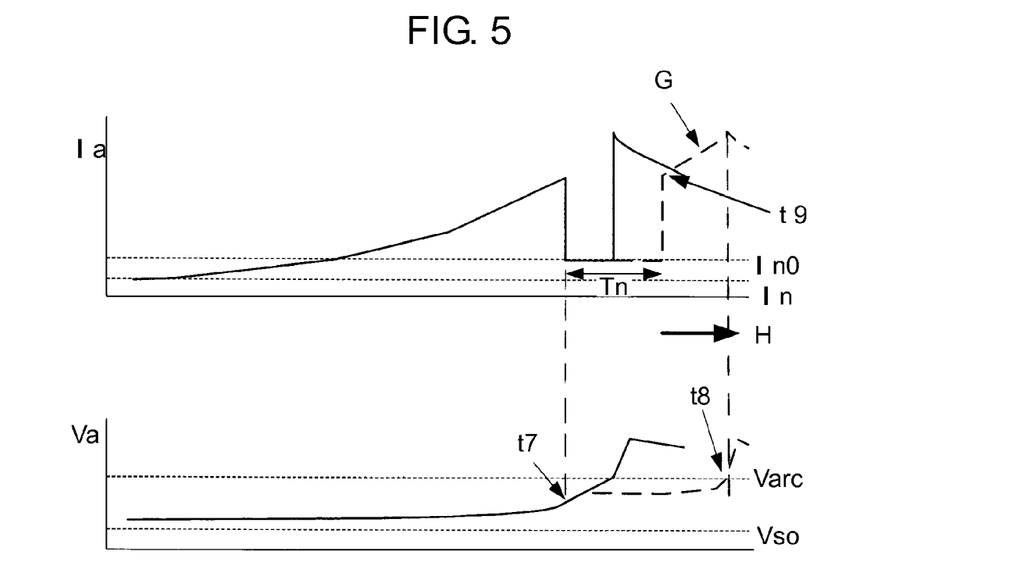
FIG. 5 is a graph showing waveforms of welding current and welding voltage by neck detection control when neck is detected in accordance with a second exemplary embodiment of the present invention.

Note here that a voltage change (noise), which increases then reduces and is back to the ordinary state, is a convex-shaped change although not specifically shown in FIG. 5.

Herein, firstly, the case where the wrong detection of neck does not occur, that is to say, the case of processing of ordinary shift in which the detection of neck is carried out and then shifted to an arc state in the subsequent predetermined time is described.

An operation of welding output control part 15 when neck is detected by neck detection apparatus 19 is described with reference to FIGS. 1 and 5. FIG. 5 is a graph showing waveforms of welding current (Ia) and welding voltage (Va) by the neck detection control when neck is detected. When welding output control part 15 receives neck detection signal Sn from neck determination part 12, it reduces welding current Ia to In0 by turning second switching element 6 off so that welding current Ia becomes predetermined neck control current In0 quickly. Thereafter, welding output control part 15 turns on second switching element 6 and controls first switching element 3 so that welding current Ia becomes In0 for a predetermined time or until the welding state becomes an arc state and waits for the determination output from A/S determination part 14 that the welding state becomes an arc state.

Furthermore, welding output control part 15 allows control state storage part 16 to store a control state (for example, current value, increased amount of electric current, and an elapsed time from the time short circuit is started, and the like) at the point of time when neck is detected (t7 in FIG. 5), and outputs a command requiring to start measurement to timer part 17 so as to allow timer part 17 to start measurement of time. When welding output control part 15 receives an A/S signal showing an arc state from A/S determination part 14 in predetermined time Tn measured by timer part 17, welding output control at the arc time is carried out so as to keep an arc length appropriate (control having a waveform shown by a solid line in FIG. 5).

Next, processing carried out when neck is detected wrongly, that is to say, when the neck detection is carried out by voltage change generated by noise, change of the welding environment, or the like, and the state is not shifted to an arc state for a subsequent predetermined time, is described.

A processing after timer part 17 is allowed to start measurement of time mentioned above is described below. In a predetermined time Tn to be measured by timer part 17, in the case where a signal showing an arc state is not input from A/S determination part 14, welding output control part 15 stops the operation of timer part 17, restarts welding current control at the time of the short circuit in accordance with the control state which has been stored in control state storage part 16 and waits for the A/S signal showing an arc state from A/S determination part 14 (control having a waveform shown by a broken line in FIG. 5). Furthermore, in this case, until the input A/S signal becomes a signal showing an arc state, neck detection signal Sn output from neck determination part 14 is ignored. Reference H in FIG. 5 shows a state in which neck detection is invalid. Thus, under the influence of restarting the welding current control at the time of short circuit in accordance with a control state that has been stored in control state storage part 16 even if welding voltage is changed, it is possible to prevent a wrong detection of neck. Note here that time Tn may be decided by experimentally measuring the time from the detection of neck to the opening of short circuit. References t7 and t8 in FIG. 5 show neck detection and the opening of the short circuit, respectively.

As mentioned above, in a case where a neck state is detected wrongly when welding voltage Va is changed, by returning to short-circuit control without forcedly opening the short circuit, it is possible to suppress the generation of spatter due to wrong detection of neck and to realize the welding control suitable for welding condition. Therefore, an excellent welding result can be obtained.

Next, in a case where a state is not shifted to an arc state in predetermined time Tn (reference G in FIG. 5), welding current control at the time of the short circuit is restarted as mentioned above (reference t9 in FIG. 5). That is to say, neck current control is shifted to short-circuit control. Control, which is carried out in order to avoid wrongly detecting that the short circuit is opened because the welding voltage may be changed by the influence of this shift from neck current control to short-circuit control, is described with reference to FIG. 6.

After neck is detected (t12 in FIG. 6), in a case where a signal showing an arc state is not input from A/S determination part 14 during time Tn, welding output control part 15 stops the operation of timer part 17 and restarts the welding current control at the time of the short circuit in accordance with the control state that has been stored in control state storage part 16 (t10 in FIG. 6) so as to allow timer part 17 to operate (measure Ts) and invalidate the A/S determination. Then, in this state, welding output control part 15 determines that the welding state is a short-circuit state and forcedly carries out processing.

Figure 6:
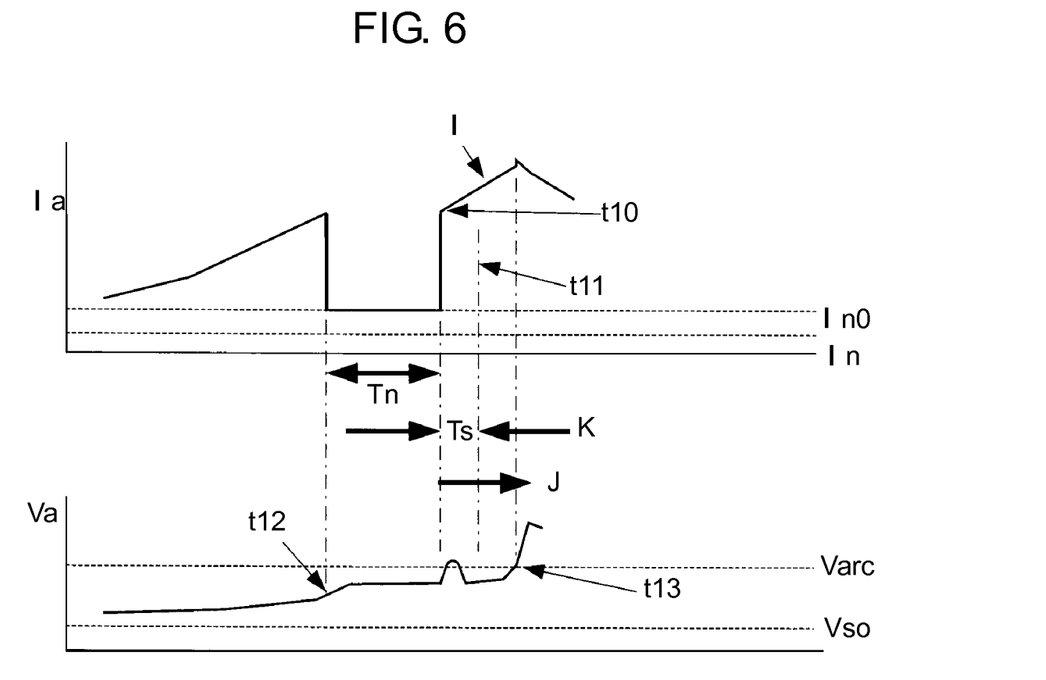
FIG. 6 is a graph showing waveforms of welding current and welding voltage at the time of short circuit welding in accordance with the second exemplary embodiment of the present invention.

Thus, neck current control is shifted from neck current control to short-circuit control with the welding voltage level relatively large (close to Varc). Under the effect of this shift, even if the welding voltage changes to become a value beyond Varc, since the A/S determination is invalidated during time Ts, it is not determined that the short circuit is opened. That is to say, it is possible to avoid wrongly detecting that the short circuit is opened, and thereby stable welding can be carried out. Furthermore, welding output control part 15 validates an A/S signal from A/S determination part 14 so that opening of the short circuit can be determined after the value of timer part 17 passes a predetermined time Ts. The short-circuit processing is continued until the welding state becomes an arc state.

Note here that welding output control part 15 ignores neck detection signal Sn output from neck determination part 12 for the time period from the point of time when the neck current control is shifted to the short-circuit control, that is to say, at the point of time when measurement of time Ts starts to the time when an A/S signal showing that the welding state becomes an arc state is input. Thus, even if the welding voltage is changed to become a voltage change amount, which is determined that neck is detected under the effect of the shift from the neck current control to the short-circuit control, neck control is not carried out wrongly. Therefore, stable welding can be carried out. Note here that reference I in FIG. 6 indicates a case where the state is not shifted to an arc state within a predetermined time. Reference K indicates a state in which the short-circuit processing is continued regardless of the A/S determination. Reference J indicates that neck detection is invalid. Reference t11 indicates the restart of A/S determination. References t12 and T13 indicate neck detection and opening of short circuit, respectively.

Third Exemplary Embodiment

In this exemplary embodiment, the same reference numerals are given to the same points as in the first and second exemplary embodiments and description therefor is omitted herein. Furthermore, description for the configuration and operation of the welding apparatus shown in FIG. 1 also may be omitted. The configuration and operation that are not shown in this exemplary embodiment are basically the same as in the first exemplary embodiment. This exemplary embodiment is different from the first or second exemplary embodiment in that an excellent welding result is obtained by realizing welding control suitable for welding state when the waveform of welding voltage Va is changed due to noise or disturbance, causing a wrong detection that a short circuit is opened. The control by welding output control part 15 in a case where a short-circuit state is shifted to an arc state in this exemplary embodiment is descried with reference to FIGS. 1 and 7.

Figure 7:
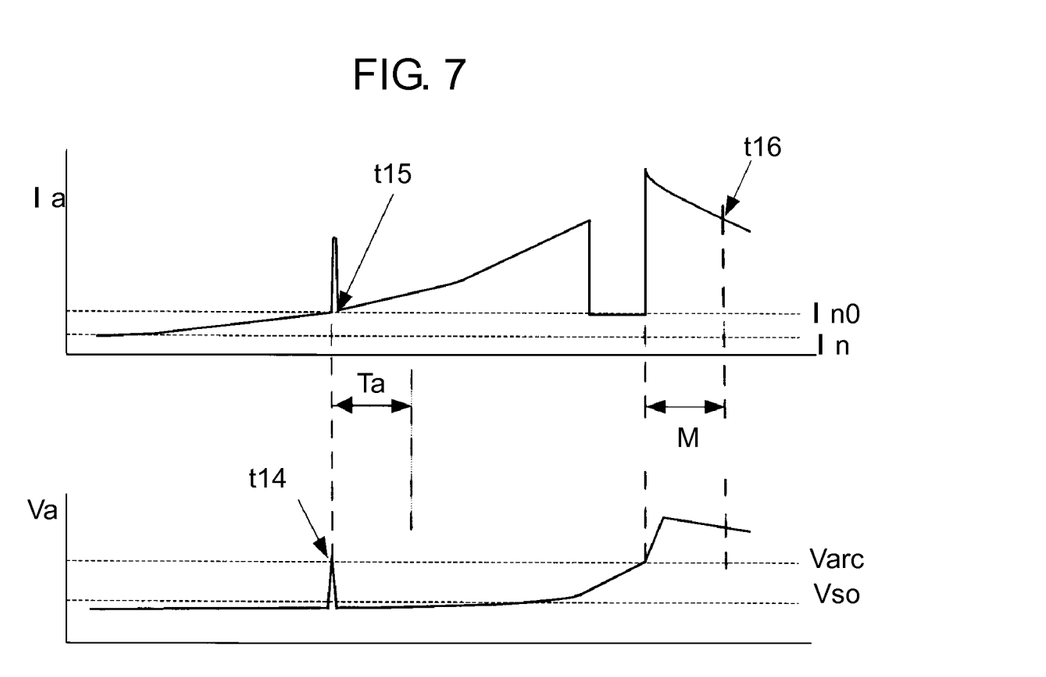
FIG. 7 is a graph showing waveforms of welding current and welding voltage to be controlled when a short-circuit state is shifted to an arc state in a third exemplary embodiment of the present invention.

FIG. 7 shows waveforms of welding current (Ia) and welding voltage (Va) to be controlled in a case where the short-circuit state is shifted to the arc state. Then, as shown in FIG. 7, in the voltage waveform, voltage change beyond short-circuit opening determination level Varc occurs, although it is for a short period. This is caused by noise or disturbance.

Hereinafter the control of the welding apparatus in this exemplary embodiment is described.

By a large voltage change due to noise etc. as mentioned above, A/S determination part 14 outputs a signal showing an arc state. When welding control output part 15 receives this signal, it allows control state storage part 16 to store the control state that was carried out just before, and sends a command requiring starting measurement to timer part 17 so as to allow timer part 17 to start measurement of time. Thereafter, when welding output control part 16 receives an A/S signal showing a short-circuit state from A/S determination part 14 (i.e., the welding voltage returns to a short-circuit state) in predetermined time Ta measured by timer part 17, it stops the operation of timer part 17 and restarts the welding current control at the time of the short circuit in accordance with a control state that has been stored in control state storage part 16. As mentioned above, even in a case where it is wrongly determined that the short circuit is opened by voltage change due to noise, etc., since control can be back to current control at the time of short circuit, it is possible to carry out a stable welding, in which the effect of the wrong detection that short circuit is opened is suppressed.

Next, control in which neck is detected normally, neck control is carried out and then short circuit is normally opened, is described. At the point of time when the short circuit is normally opened, time Ta is started to be measured by timer part 17. During time Ta, an arc state is continued. In a state in which the time measured by timer part 17 is beyond predetermined time Ta, when an A/S signal showing an arc state is received from A/S determination part 14, welding output control part 15 stops the operation of timer part 17, abandons (t16 in FIG. 7) the control state that was stored in control state storage part 16 at the previous arc state, and carries out welding control in the arc state. Later than this time, when welding output control part 15 receives an A/S signal showing a short-circuit state from A/S determination part 14 again, it determines that the welding state becomes a short-circuit state and carries out processing at the time of short circuit by an initial control of short circuit. Note here that t14, t15 and t16 in FIG. 7 indicate an arc determination and continuation from the immediately preceding short-circuit processing states. Furthermore, reference M indicates that an arc state continues during time Ta.

As mentioned above, an arc state is allowed to be generated for a predetermined period after it is once determined that the state is an arc state. Thereby the occurrence of spatter can be reduced by reducing an arc unstable state. Furthermore, with respect to wrong determination of an arc state due to noise, etc., welding can be controlled appropriately, and thus an excellent welding result can be obtained.

Note here that values relating to electric current and voltage, Is0, Varc, Vs0, In0 and In, which were used in the first to third exemplary embodiments, may be determined based on experiments, and the like.

INDUSTRIAL APPLICABILITY

A control method for an arc welding apparatus and an arc welding apparatus using the same in accordance with the present invention prohibits detection of neck based on a change amount of welding voltage. As a result, even when the welding voltage is changed due to noise, etc., since wrong detection of neck is prevented and neck determination can be carried out accurately, making it possible to be used in, for example, a place that is much influenced by noise, etc.

The invention claimed is:

1. A control method for an arc welding apparatus having a neck determination part, a control state storage part, an arc/short-circuit determination part and a welding output control part, said method comprising:

detecting welding voltage;

calculating a change amount of the welding voltage;

determining neck of a droplet based on the change amount of the welding voltage and a neck determination threshold of a droplet using the neck determination part, the neck being generated prior to a transition from a short circuit state to an arc state;

storing a short-circuit processing state using the control state storage part at a time at which neck is determined;

after said determining of neck, determining any one of an arc period and a short-circuit period using the arc/short-circuit determination part based on the welding voltage; and determining that neck is wrongly determined in said determining of neck, and carrying out a short-circuit processing from the stored short-circuit processing state using the welding output control part in response to a short-circuit period being determined by the arc/short-circuit determination part when a first predetermined period has passed after said determining of neck.

2. The control method for an arc welding apparatus of claim 1, further comprising:

after said carrying out of the short-circuit processing from the stored short-circuit processing state, prohibiting a determination that a second predetermined period is any one of an arc period and a short-circuit period.

3. A control method for an arc welding apparatus having an arc/short-circuit determination part, a control state storage part and a welding output control part, said method comprising:

determining that a short circuit is opened using the arc/short-circuit determination part based on welding voltage and a short-circuit opening determination threshold;

storing a short-circuit processing state using the control state storage part at a time at which it is determined that the short circuit is opened, the short circuit becoming opened at a time that a short circuit state is shifted to an arc state;

determining an arc period or a short-circuit period using the arc/short-circuit determination part based on the welding voltage after said determining that the short circuit is opened; and determining that said determining that the short circuit is opened is wrongly made, and carrying out short-circuit processing from the stored short-circuit processing state using the welding output control part in response to a short-circuit period being determined by the arc/short-circuit determination part in a predetermined period after said determining that the short circuit is opened.

4. The control method for an arc welding apparatus of claim 3, further comprising:

abandoning the stored short-circuit processing state and carrying out an arc processing in response to an arc period being determined in a predetermined period after said determining that the short circuit is opened.

5. An arc welding apparatus comprising:

a neck determination part for determining neck of a droplet based on a change amount of welding voltage and a neck determination threshold, the neck being generated prior to a transition from a short circuit state to an arc state;

a control state storage part for storing a short-circuit processing state at a time at which neck is determined;

an arc/short-circuit determination part for determining an arc period or a short-circuit period based on welding voltage after neck is determined; and a welding output control part for determining that a determination of neck is wrongly made and carrying out a short-circuit processing from the short-circuit processing state stored in the control state storage part in response to a short-circuit period being determined when a first predetermined period has passed after neck is determined.

6. The arc welding apparatus of claim 5, wherein the welding output control part prohibits a determination that a second predetermined period is any one of an arc period and a short-circuit period, the second predetermined period beginning at a time at which short-circuit processing is started.

7. An arc welding apparatus comprising:

an arc/short-circuit determination part for determining that a short circuit is opened based on welding voltage and a short-circuit opening determination threshold;

a control state storage part for storing a short-circuit processing state at a time at which it is determined that the short circuit is opened, the short circuit becoming opened at a time that a short circuit state is shifted to an arc state; and a welding output control part, wherein the arc/short-circuit determination part determines any one of an arc period and a short-circuit period based on the welding voltage in response to a determination that the short circuit is opened, and wherein the welding output control part determines that the determination that the short circuit is opened is wrongly made, and carries out a short-circuit processing from the short-circuit processing state stored in the control state storage part in response to a short-circuit period being determined in a predetermined period after the determination that the short circuit is opened.

8. The arc welding apparatus of claim 7, wherein the welding output control part abandons the short-circuit processing state stored in the control state storage part and carries out an arc processing in response to an arc period being determined in a predetermined period after the determination that the short circuit is opened.

* * * * *